United States Patent [19]

Schuetz

[11] Patent Number: 4,798,751

[45] Date of Patent: Jan. 17, 1989

[54] HEAT SHRINKABLE MULTILAYER FILM FOR PRIMAL MEAT PACKAGING

[75] Inventor: Jeffrey M. Schuetz, Woodridge, Ill.

[73] Assignee: Viskase Corporation, Chicago, Ill.

[21] Appl. No.: 54,920

[22] Filed: May 28, 1987

[51] Int. Cl.$^4$ .................... B32B 27/08; B65D 25/22
[52] U.S. Cl. .................... 428/34.9; 428/216; 428/516; 428/520; 428/910; 428/349; 428/323; 428/35.4; 264/176.1; 264/209.1; 264/173; 426/127
[58] Field of Search ............... 428/216, 35, 518, 520, 428/910

[56] References Cited

U.S. PATENT DOCUMENTS

| | | |
|---|---|---|
| 2,233,442 | 3/1941 | Wiley . |
| 3,741,253 | 6/1973 | Brax .................... 428/520 X |
| 4,178,401 | 12/1979 | Weinberg .................. 428/35 |
| 4,194,039 | 3/1980 | Mueller .................. 428/518 X |
| 4,278,738 | 7/1981 | Brax et al. . |
| 4,448,792 | 5/1984 | Schirmer . |

FOREIGN PATENT DOCUMENTS 982923 2/1976 Canada .

*Primary Examiner*—P. C. Ives
*Attorney, Agent, or Firm*—John C. LeFever

[57] ABSTRACT

A heat-shrinkable, multilayer film suitable for use in fabricating bags for packaging primal and sub-primal meat cuts and processed meats. The multilayer film contains a barrier layer comprising a blend of vinylidene chloride-methyl acrylate copolymer and vinylidene chloride-vinyl chloride copolymer having between about 2.9 and about 13.5 weight percent methyl acrylate, and between about 2.9 and about 11.6 weight percent vinyl chloride in the blend. The multilayer film preferably has the copolymer blend as a core layer with first and second outer layers preferably comprising ethylene-vinyl acetate copolymer. The film may be extruded without processing difficulties and is preferably irradiated, but the barrier layer does not show significant discoloration with irradiation.

30 Claims, No Drawings

HEAT SHRINKABLE MULTILAYER FILM FOR PRIMAL MEAT PACKAGING

FIELD OF THE INVENTION

This invention relates to a heat-shrinkable biaxially stretched multilayer film with a barrier layer comprising a blend of vinylidene chloride-methyl acrylate copolymer and vinylidene chloride-vinyl chloride copolymer suitable for use in the manufacture of bags for packaging primal and sub-primal meat cuts and processed meats. In a preferred embodiment this invention relates to a three-layer film with the aforedescribed copolymer blend as a core layer wherein the outer layers of the film preferably comprise ethylene-vinyl acetate copolymer. The film is preferably irradiated after biaxial orientation.

BACKGROUND OF THE INVENTION

Primal meat cuts, or primals, are large cuts of meat, smaller, for example, than a side of beef, but larger than the ultimate cut that is sold at retail to the consumer. Primal cuts are prepared at the slaughter house and are then shipped to a retail meat store or an institution such as a restaurant where they are butchered into smaller cuts of meat called sub-primal meats cuts or sub-primals. Sub-primals may also be prepared at the slaughter house. When primals and sub-primals are prepared at the slaughter house, they are usually packaged in such a way that air (i.e., oxygen) is prevented from contacting the meat during shipping and handling in order to minimize spoilage and discoloration. One desirable way to package primals and sub-primals so as to protect them from degradation due to moisture loss and contact with air is to shrink package them with a packaging material that has good barrier properties. One such shrink packaging material that has good oxygen and moisture barrier properties is vinylidene chloride-vinyl chloride copolymer film.

One approach to the provision of a film for use in shrink packaging primal and sub-primal meat cuts and processed meats is to employ a multilayer film having oxygen and moisture barrier properties, one layer of which is a vinylidene chloride-vinyl chloride copolymer film. The other layer or layers of such a multilayer film are selected so as to provide the requisite low temperature properties and abrasion resistance which are lacking in vinylidene chloride-vinyl chloride film. In providing such a film, however, it must be recognized that good barrier properties, abrasion resistance, and low temperature properties are not the only requirements for a film that is to be used for shrink packaging primal and sub-primal meat cuts. The film must have been biaxially stretched in order to produce shrinkage characteristics sufficient to enable the film to heat shrink within a specified range of percentages, e.g., from about 15 to 60 percent at about 90° C., in both the machine and the transverse directions.

The film must also be heat sealable in order to be able to fabricate bags from the film and in order to heat seal the open mouths of the fabricated bags when the meat cut has been placed within the bag. Additionally, the heat sealed seams of the bags must not pull apart during the heat shrinking operation, the film must resist puncturing by sharp edges such as bone edges during the heat shrinking operation, and there must be adequate adhesion between the several layers of the film so that delamination does not occur, either during the heat shrinking operation or during exposure of the film to the relatively high temperatures that may be reached during shipping and storage of the film in the summertime.

It has been proposed to prepare multilayer films, one layer of which is a vinylidene chloride-vinyl chloride copolymer and at least one other layer of which is an ethylene-vinyl acetate copolymer. For example, such films are proposed in McFedries, Jr., et al U.S. Pat. No. 3,600,267; Peterson U.S. Pat. No. 3,524,795; Titchenal et al. U.S. Pat. No. 3,625,348, Schirmer U.S. Pat. Nos. 3,567,539 and 3,607,505; and Widiger et al U.S. Pat. No. 4,247,584.

In addition, multilayer films comprising a core layer of a vinylidene chloride copolymer, wherein the latter is a copolymer of a vinylidene chloride monomer and a vinyl chloride monomer, are known, for example as disclosed in Brax et al, U.S. Pat. Nos. 3,741,253 and 4,278,738; Baird et al, U.S. Pat. No. 4,112,181; and Lustig et al Canadian Pat. No. 982,983.

Also in the prior art, cross-linking by irradiation has been used to enhance the properties of films employed in packaging operations. For example, U.S. Pat. No. 3,741,253 to Brax et al teaches a multi-ply laminate having a first ply of ethylene-vinyl acetate which is cross-linked by irradiation. The second ply and the third ply of the laminate are not irradiated. The thus-prepared laminate may then be biaxially stretched. Baird et al U.S. Pat. Nos. 3,821,182 and 4,112,181 teach a three-layer film combination which has been irradiated before stretching. Further, Bernstein et al U.S. Pat. Nos. 4,391,862 and 4,352,844 disclose co-extruding first and second polymeric layers, irradiating the co-extruded layers, joining a third layer to the second polymeric layer, and then stretching the multilayer film. Still further, Bieler et al U.S. Pat. No. 4,318,763 teaches that the seals of the bags made of multilayer film may be strengthened by cross-linking the seal area of the bag by irradiation. Finally, the entire multilayer film is preferably irradiated after biaxial orientation, as for example described in European Patent Application Publication 86-0202328.

However, it has been found that an irradiated multilayer film containing a vinylidene chloride-vinyl chloride copolymer layer discolors significantly during storage due to degradation of this layer. It is believed that discoloration of the vinylidene chloride-vinyl chloride copolymer layer is due to radiation-induced cleavage of hydrogen and chloride radicals resulting in the production of double bonds and the associated chromophores. Discoloration also occurs when this copolymer layer is exposed to elevated (above ambient) temperatures for sustained periods.

One solution to this problem is to use vinylidene chloride-methyl acrylate copolymers as the barrier layer is shrinkable multilayer films, based on the discovery that this copolymer does not significantly discolor from irradiation on sustained exposure to high temperatures. This discovery is described in European Patent Application Publication 86-0204918.

Notwithstanding this important advantage of no significant discoloration, there are processing difficulties associated with vinylidene chloride-methyl acrylate copolymer films as compared to the vinylidene chloride-vinyl chloride type. The basic problem is that this methyl acrylate copolymer is very temperature and shear sensitive during extrusion into a film. This extrusion can only be performed over a narrow temperature range without causing premature degradation of the polymer in the extruder or die. This premature degradation causes particles or gels of degraded material to exit from the extruder. These particles cause imperfections in the film and may result in a bubble break and waste of film product. During coextrusion of a multilayer film, the optimum melt temperatures of the various layers may be significantly different. Accordingly, there is a need for a wider range of methyl acrylate copolymer extrusion process temperatures to enable extrusion with other copolymers. Even at optimum extrusion temperatures, a certain amount of degraded material will form in the extruder and die. It is important to retain this material in the extrusion system in the form of a thin layer on the extruder and die walls as long as possible between equipment clean outs.

An object of this invention is to provide an improved barrier layer-containing multilayer shrinkable film which does not discolor on irradiation or sustained exposure to elevated temperatures, but which avoids processing difficulties due to temperature/shear sensitivity during double bubble to coextrusion.

Other objects and advantages of this invention will be apparent from the ensuing disclosure and appended claims.

SUMMARY OF THE INVENTION

I have unexpectedly discovered that the aforedescribed objectives are realized in a heat-shrinkable, biaxially stretched multilayer film containing a barrier layer comprising a blend of vinylidene chloride-methyl acrylate copolymer and vinylidene chloride-vinyl chloride copolymer with between about 2.9 and about 13.5 weight percent methyl acrylate, and between about 2.9 and about 11.6 weight percent vinyl chloride in the blend. Even though the major constituent of the barrier layer copolymer is methyl acrylate, such a film may be prepared by the double bubble extrusion method without experiencing the processing difficulties associated with methyl acrylate copolymer barrier layer-type multilayer films. Yet the film does not significantly discolor (i.e., yellow) on irradiation or exposure to elevated temperature for sustained periods, even though it contains a substantial quantity of vinyl chloride copolymer.

In a preferred embodiment, the aforedescribed barrier layer is a core layer of a three layer film with first and second outer layers comprising ethylene-vinyl acetate copolymer. It will be understood by those skilled in the art that certain other polymers may be used in the first and second outer layers instead of ethylene-vinyl acetate, or in blends therewith. These alternative polymers must satisfy the physical and functional requirements of the outer layers, as for example high shrink, puncture resistance and abrasion resistance. By way of illustration, the outer layers may comprise certain polyethylenes or blends thereof with ethylene vinyl acetate.

The film is preferably irradiated after biaxial orientation to cross-link the other, e.g., ethylene-vinyl acetate layers. The resulting film can be successfully employed in the shrink packaging of primal and sub-primal meat cuts and processed meats. Specifically, this invention provides a multilayer film which can be extruded without encountering severe processing limitations and difficulties, and which has outstanding color stability after irradiation. The film can then be advantageously employed to fabricate bags useful for shrink packaging primal and sub-primal meat cuts and processed meats.

DETAILED DESCRIPTION OF THE INVENTION

In a preferred embodiment the vinylidene chloride-vinyl chloride copolymer molecular weight in the barrier layer is at least about 75,000 to readily achieve the desired biaxial orientation and film toughness, and up to about 135,000 for ease of extrudability. The most preferred range is between about 120,000 and about 130,000 molecular weight. Also, the vinyl chloride content in the copolymer is preferably between about 5 weight percent for ease of extrudability and up to about 35 weight percent for maximum barrier properties, the most preferred range being between 15 and 30 weight percent vinyl chloride.

In another preferred embodiment the vinylidene chloride-methyl acrylate copolymer molecular weight in the barrier layer is at least about 75,000 to readily achieve the desired biaxial orientation and film toughness, and up to about 130,000 for ease of extrudability. The most preferred range is between about 90,000 and about 110,000 molecular weight. Also, the methyl acrylate content in the copolymer is preferably between about 5 weight percent for ease of extrudability and up to about 15 weight percent which is the U.S. Federal Food and Drug Administration's limit. The most preferred range for methyl acrylate content is between about 6 and about 10 weight percent in the copolymer with vinylidene chloride.

In another preferred embodiment of this invention, there is provided a heat-shrinkable multilayer film having a first outer layer comprising a first ethylene-vinyl acetate copolymer, said first ethylene-vinyl acetate copolymer having a melt index of from about 0.1 to about 1.0 decigram per minute and a vinyl acetate content of from about 9 to about 15 weight percent, based on the weight of said first ethylene-vinyl acetate copolymer. The film also preferably includes a second outer layer comprising an ethylene-vinyl acetate copolymer having a melt index of from about 0.1 to about 1.0 decigram per minute and a vinyl acetate content of from about 3 to about 18 weight percent, based on the weight of said ethylene-vinyl acetate copolymer.

In general, various conventional additives such as slip agents, anti-blocking agents and pigments can be incorporated in the multilayer film of this invention, as is well known in the art.

The core layer of the multilayer film of this invention preferably comprises a blend of vinylidene chloride-methyl acrylate copolymer and vinylidene chloride-vinyl chloride copolymer, with between about 4 and about 12 weight percent methyl acrylate and between about 5.8 and about 8.7 weight percent vinyl chloride. This blend is an optimum balance between no significant discoloration on irradiation or exposure to elevated temperature for sustained periods, and avoidance of processing difficulties during manufacturing.

The core layer of the methyl acrylate and vinyl chloride copolymer blends preferably contains less than 5 weight percent plasticizer, the percentage being based on the total weight of the blend of copolymers and all additives including plasticizer, in order to maximize the barrier properties of the thin film. Conventional plasticizers such as dibutyl sebacate and epoxidized soybean oil can be used.

The heat-shrinkable multilayer film of this invention can be produced by known techniques such as by co-extruding the multiple layers through an annular die into a primary tube, followed by biaxially stretching the tube in accordance with the conventional "double bubble" technique disclosed in Pahlke U.S. Pat. No. 3,456,044. Alternatively, the films may be fabricated by extrusion coating, wherein a base tube is extruded and succeeding layers are surface coated on the base tube in a manner such as that disclosed in the aforementioned U.S. Pat. No. 3,741,252 to Brax et al. Also, the multilayer film may be slot cast and biaxially stretched by tentering before the resulting sheet is fabricated into bags. Still further, the inventive multilayer film may be fabricated by producing separate film layers and then laminating the layers together.

The multilayer film is preferably irradiated to a dosage level of between about 1 megarad and about 5 megarads, such as by passing it through an electron beam irradiation unit. The multilayer film may then be employed to manufacture heat-shrinkable bags useful in packaging primal and sub-primal meat cuts and processed meats.

In accordance with still another preferred embodiment of this invention, the first outer layer of the multilayer film is an ethylene-vinyl acetate copolymer containing from about 9 to about 15 weight percent of vinyl acetate, based on the weight of the copolymer, said copolymer having a melt index of between about 0.1 and about 1.0 decigram per minute, and it may be selected from the group consisting of (a) a single ethylene-vinyl acetate copolymer and (b) a blend of ethylene-vinyl acetate copolymers having melt indices and vinyl acetate contents within the aforementioned ranges of values.

The second outer layer of the multilayer film of this preferred embodiment comprises an ethylene-vinyl acetate copolymer selected from the group consisting of (a) an ethylene-vinyl acetate copolymer having a melt index of from about 0.1 to about 1.0 decigram per minute and a vinyl acetate content of from about 3 to about 18 weight percent, most preferably from about 10 to about 15 weight percent, based on the weight of said second ethylene-vinyl acetate copolymer, and (b) a blend of at least two ethylene-vinyl acetate copolymers, wherein one of said ethylene-vinyl acetate copolymers has a melt index of from about 0.1 to about 1.0 decigram per minute and a vinyl acetate content of from about 10 to about 18 weight percent, based on the weight of said copolymer, and the other ethylene-vinyl acetate copolymer has a melt index of from about 0.1 to about 1.0 decigram per minute and a viny acetate content of from about 2 to about 10 weight percent, based on the weight of said copolymer. The blend (b) of said two ethylene-vinyl acetate copolymers has a vinyl acetate content of from about 3 to about 18 weight percent, and preferably from about 10 to about 15 weight percent, based on the weight of said copolymers.

The multilayer film of this invention will generally have a total thickness of from about 1.75 mils to about 4.0 mils, and preferably of from about 2.0 mils to about 4.0 mils, because when the thickness of the multilayer film is more than 4.0 mils, clipping problems are encountered in that it is difficult to gather together the open end of a bag made therefrom. When the thickness of the multilayer film is less than 1.75 mils, the bag will have diminished puncture resistance.

The first outer layer will preferably have a thickness of from about 1.1 mils to about 2.0 mils; the core layer will preferably have a thickness of from about 0.20 mil to about 0.45 mil; and the second outer layer will preferably have a thickness of from about 0.4 mil to about 1.5 mils. The thickness of the first outer layer, which is the inner layer of the bag, is preferably within the aforementioned range because the sealing and processability properties of the film layer would otherwise be diminished. The thickness of the core layer is preferably within the above-indicated range because the film would provide inadequate barrier properties if the core layer thickness is less than about 0.20 mil. The preferred upper limit of 0.45 mil for the core layer is based on the barrier effectiveness needed for intended uses of the multilayer film. The thickness of the second outer layer, which is the outer layer of the bag, is preferably in the aforementioned range to provide desired toughness and puncture resistance and also keep the total thickness of the film in the range from about 1.75 mils to about 4.0 mils.

After biaxial stretching by any suitable method well known in the art, the multilayer film of this invention is preferably irradiated to a dosage level of between about 1 megarad and about 5 megarads, and most preferably between about 2 megarads and about 3 megarads, by any suitable method such as by employing an electron beam. When the energy level is below the indicated range, sufficient cross-linking is not obtained to improve the heat sealing characteristics of the multilayer film or to have any enhanced effect upon the toughness properties of the film. When the energy level is above the aforementioned range, the degree of the film shrinkage is significantly reduced and further improvements in the heat sealing characteristics and toughness properties of the film are not achieved.

In another aspect of this invention, bags suitable for the shrink packaging of primal and sub-primal meat cuts and processed meats are provided from the aforedescribed multilayer film. The bags may be produced from the three-layer film of this invention by heat sealing. For instance, if the film of this invention is produced in the form of tubular film, bags can be produced therefrom by heat sealing one end of a length of the tubular film or by sealing both ends of the tube, then slitting one edge to form the bag mouth. If the film of this invention is made in the form of flat sheets, bags can be formed therefrom by heat sealing three edges of two superimposed sheets of film. When carrying out the heat sealing operation, the surfaces which are heat sealed to each other to form seams are the aforedescribed first outer layers of the films of the invention. Thus, for example, when forming a bag by heat sealing one edge of a length of tubular film, the inner surface of the tube, i.e., the surface which will be heat sealed to itself, will be the first outer layer of the film.

Although the invention is specifically described in the form of a three layer film, in its broadest context only two layers are required: the barrier layer and one outer layer. More than three layers are also contemplated, for example, a five layer film comprising outer layers of polypropylene or ethylene-propylene copolymer, the aforedescribed blend as a barrier layer and an adhesive layer between each outer layer and the barrier layer.

The invention is further illustrated by the examples which appear below. In these examples, parts and percentages are by weight, unless otherwise specified.

The following test methods were used in determining the properties of the resins and films used in the examples. Melt index values were obtained pursuant to ASTM Method D-1238, condition E. Tensile strength and elongation values were obtained following ASTM Method D-882, procedure A. Oxygen transmission was tested in accordance with ASTM Method D-3985-81. Haze was measured in accordance with ASTM Method D-1003, Procedure A, and gloss was measured in accordance with ASTM Method D-523, 45° angle.

Non-ASTM test methods employed are described in the following discussion. Shrinkage values were obtained by measuring unrestrained shrink at 90° C. for five seconds. Four samples were tested and the arithmetic average value reported.

The dynamic puncture-impact test procedure is used to compare films for their resistance to bone puncture. It measures the energy required to puncture a test sample with a sharp triangular metal point made to simulate a sharp bone end. A Dynamic Ball Burst Tester, Model No. 138, available from Testing Machines, Inc., Amityville, Long Island, NY, is used and a ⅜ inch diameter triangular trip, as aforedescribed, is installed on the tester probe arm and employed in this test procedure. Six test specimens approximately 4 inches square are prepared, a sample is placed in the sample holder, and the pendulum is released. The puncture energy reading is recorded. The test is repeated until 6 samples have been evaluated. The results are calcualted in cm-kg per mil of film thickness.

Film color measurements were obtained using the CIELAB (Commission Internationale de l'Eclairage) uniform color space. The CIELAB L* axis represents a lightness to darkness continuum, and the CIELAB b* axis represents a yellow (positive) to blue (negative) continuum.

A MacBeth 5000 Plus Spectrophotometer (purchased from MacBeth Division of Kollmorgan Corp, Newburgh, NY) was used to determine L* and b* values. Sixteen film layers were inserted in the spectrophotometer. The MacBeth instrument with a D-5000 illuminant was used with a 2 degree viewing angle to determine the L* and b* values. Two determinations on each film sample were made and the results were averaged.

EXAMPLE I

Biaxially stretched three-layer films were prepared by a "double bubble" process similar to that disclosed in U.S. Pat. No. 3,456,044 by co-extruding the following compositions through a multilayer die, biaxially stretching the co-extruded primary tube, and then irradiating the biaxially stretched tube. The core (barrier) layer of all tested compositions contained less than 5 weight percent as plasticizer. Mixtures of vinylidene chloride-methyl acrylate copolymer and vinylidene chloride-vinyl chloride copolymer were prepared by experimentally determining the plasticizer content for each resin mixture which would give optimum extrusion performance and also matching melt viscosities so that the two resins would melt and extrude similarly. Blending was done by first blending the vinylidene chloride-vinyl chloride copolymer with its optimum plasticizer level and next following the same procedure for the vinylidene chloride-methyl acrylate copolymer with its optimum plasticizer level. Then the two resins were mixed in the proper proportions to obtain the compositions outlined in the examples.

The weight percent of vinylidene chloride-methyl acrylate copolymer and vinylidene chloride-vinyl chloride copolymer in the core layer was varied in compositions 1 through 6 between 8.0 weight percent methyl acrylate and 0 weight percent vinyl chloride (100% vinylidene chloride-methyl acrylate copolymer) (composition 1) to 0 weight percent methyl acrylate and 29.0 weight percent vinyl chloride (100L % vinylidene chloride-vinyl chloride copolymer) (composition 6). All other compositional aspects of samples 1 through 6 were identical, so that the effect of varying the core layer composition on extrusion performance, tristimulus color, haze, gloss and shrink values was directly measured.

The first outer layer of about 1.4 mils thickness was made of ethylene-vinyl acetate copolymer containing about 11% by weight of vinyl acetate, based on the weight of the copolymer, and having a melt index of about 0.25 decigram per minute (EVA copolymer). The second outer layer of about 0.6 mils thickness comprised a blend of (a) about 75 weight percent of ethylene-vinyl acetate copolymer having about 12 weight percent vinyl acetate and a melt index of about 0.35 decigram per minute, and (b) about 25 weight percent of ethylene-vinyl acetate copolymer having about 4.5 weight percent vinyl acetate and a melt index of about 0.25 decigram per minute (EVA copolymer).

The core layers of compositions 2 through 6 included vinylidene chloride-vinyl chloride copolymer containing about 29 weight percent vinyl chloride (VDC-VC copolymer) and having a molecular weight of about 125,000. Compositions 1 through 5 included vinylidene chloride-methyl acrylate copolymer containing about 8 weight percent methyl acrylate and having a molecular weight of about 100,00 (MA-VDC copolymer). The core layer thickness was about 0.3 mils so that the three layer film compositions 1 through 6 each had an average thickness of about 2.3 mils.

After biaxial orientation, the films were each irradiated to a dosage level of about 3 megarads by passing the films through the electron curtain of an irradiation unit and immediately rewound. The irradiated films were then maintained at 120° F. for 4 days for accelerated aging. This exposure is equivalent to about 100 days aging at 70° F. It has previously been determined that any discoloration of the irradiated core layer due to aging will appear during this period.

The results of these tests are summarized in Table I. It will be noted that extrusion performance has been qualitatively rated as poor, fair or excellent. These ratings were based on melt pressure stability as measured at the head of the extruder, and the amount of waste. The latter reflects production loss due to bubble break and contaminants in the extruded film. From the standpoint of extrusion performance, Table I indicates that composition 1 (8.0% MA, 0% VC) was poor, and composition 2 (7.2% MA, 2.9% VC) was fair. Compositions 3 through 6 with progressively higher concentrations of VC in the core layer all provided excellent extrusion performance. It was surprising that significantly improved extrusion performance could be achieved with as little as 2.9 weight percent vinyl chloride in the blend with methyl acrylate copolymer, and this supports the broad lower limit of VC-VDC content in the multilayer film barrier layer of the invention. However, further improvement in extrusion performance was obtained by increasing the VC content from 2.9% (composition 2) to 7.2% (composition 3), and this supports the preferred vinyl chloride content of at least about 5.8 weight percent.

Inspection of the CIELAB color values demonstrates the L (clarity) values were higher in the 7.2% MA/2.9% VC (composition 2) to 4.8% MA/11.6% VC (composition 4) range than with 0% MA/29% VC (composition 6). The b color values rise with increasing yellowness. This data demonstrates that yellowness is relatively stable at a low value of about 8 to 9 until the VC content is increased to a level between 7.2% (composition 3) and 11.6% (composition 4). This relationship supports the broad upper limit of 11.6 weight percent vinyl chloride in the barrier layer blend. Also, the b (yellowness) value difference between 7.2% VC and 11.6% VC supports the preferred upper limit of 8.7 weight percent vinyl chloride in the barrier layer blend.

Compositions 4 also supports the broad lower limit for methyl acrylate content since the 4.8 weight percent MA is based on a copolymer containing 8 weight percent MA, and in one embodiment the minimum MA content in this copolymer may be about 5 weight percent. With such an MA coolymer, the MA content in composition 4 would be about 3 weight percent. Composition 2 supports the broad upper limit for methyl acrylate content since the 7.2 weight MA (based on the 8 weight percent MA copolymer) when considered in the context of the 15 weight percent MA upper limit copolymer embodiment, corresponds to 13.5 weight percent methyl acrylate in the barrier layer.

TABLE I

| Composition Number | Core Layer Formulation % MA | Core Layer Formulation % VC | Extrusion Performance | CIELAB Color 3 Mrad + 4 Days @ 120° F. L* (clarity) | CIELAB Color 3 Mrad + 4 Days @ 120° F. b* (yellowness) | Haze % | Gloss % | Shrink @ 90° C. (MD/TD) |
|---|---|---|---|---|---|---|---|---|
| 1 | 8 | 0 | Poor | 86.3 | 8.6 | 5.5 | 81 | — |
| 2 | 7.2 | 2.9 | Fair | 88.1 | 9.5 | 4.5 | 91 | 46/56 |
| 3 | 6 | 7.2 | Excellent | 86.8 | 9.2 | 5.3 | 89 | 48/56 |
| 4 | 4.8 | 11.6 | Excellent | 87.6 | 11.3 | 6.7 | 85 | 47/57 |
| 5 | 4 | 14.5 | Excellent | 85.9 | 12.0 | 6.0 | 84 | — |
| 6 | 0 | 29 | Excellent | 83.3 | 15.9 | — | — | — |

EXAMPLE II

Another series of tests were performed to compare the physical properties of a three-layer film embodiment of this invention (composition 8 with 6% MA and 7.2% VC) with otherwise identical films having a core layer containing 8% methyl acrylate (composition 7) and a core layer with 4% MA and 14.5% VC (composition 9). The films were prepared in the same manner as the Example I compositions and had the same dimensional characteristics.

The physical properties are summarized in Table II. The secant modulus values for composition 8 (this invention) are between compositions 7 and 9. The oxygen transmission value for composition 8 is somewhat higher than composition 7 but still acceptable. However, the value for composition 9 is substantially higher. The CIELAB color values for composition 9 are significantly higher than compositions 7 and 8, indicating significant yellowing. These experiments demonstrate the unexpectedly superior properties of this invention (composition 8) compared with an 8% methyl acrylate-0% vinyl chloride core layer (composition 7) and a film with a core layer blend of methyl acrylate copolymer-vinyl chloride copolymer outside the scope of the invention (composition 9).

TABLE II

| Property | Composition Number 7 | Composition Number 8 | Composition Number 9 |
|---|---|---|---|
| Haze, % | 9.8 | 10.3 | 10.6 |
| Gloss, % | 81 | 81 | 81 |
| Shrinkage, % @ 90° C. MD/TD | 44/52 | 43/53 | 44/54 |
| Tensile Strength, PSI MD/TD | 10,100/13,200 | 10,300/12,000 | 9,800/12,200 |
| Elongation @ Break, % MD/TD | 175/165 | 175/150 | 170/155 |
| Oxygen Transmission, cc/100 in²/24 hr/atm | 0.87 | 1.09 | 1.59 |
| CIELAB Color, 4 Days @ 120° F. | | | |
| L* | 87.5 | 86.8 | 85.9 |
| b* | 8.8 | 9.2 | 12.0 |

Although certain embodiments of this invention have been described in detail, it is contemplated that modifications thereof may be made and some preferred features may be employed without others, all within the spirit and scope of the broad invention.

What is claimed is:

1. A heat-shrinkable, biaxially stretched multilayer film suitable for packaging primal and sub-primal meat cuts and processed meats, said film containing a barrier layer comprising a blend of vinylidene chloride-methyl acrylate copolymer and vinylidene chloride-vinyl chloride copolymer having between about 2.9 and about 13.5 weight percent methyl acrylate, and between about 2.9 and about 11.6 weight percent vinyl chloride in said blend.

2. A heat-shrinkable, biaxially stretched multilayer film in accordance with claim 1 wherein said barrier layer is a core layer.

3. A heat-shrinkable, biaxially stretched multilayer film in accordance with claim 1 wherein said multilayer film has at least three layers.

4. A heat-shrinkable, biaxially stretched multilayer film in accordance with claim 1 wherein said multilayer film has been irradiated to a dosage level of between about 1 megarad and about 5 megarads.

5. A heat-shrinkable, biaxially stretched multilayer film in accordance with claim 1 wherein said methyl acrylate comprises between about 4 and about 12 weight percent and said vinyl chloride comprises between about B 5.8 and about 8.7 weight percent in said blend.

6. A heat-shrinkable, biaxially stretched multilayer film in accordance with claim 1 wherein the vinylidene chloride-methyl acrylate copolymer molecular weight is between about 75,000 and about 130,000.

7. A heat-shrinkable, biaxially stretched multilayer film in accordance with claim 1 wherein the vinylidene chloride-methyl acrylate copolymer molecular weight is between about 90,000 and about 110,000.

8. A heat-shrinkable, biaxially stretched multilayer film in accordance with claim 1 wherein methyl acrylate comprises between about 5 and about 15 weight percent of the vinylidene chloride-methyl acrylate copolymer.

9. A heat-shrinkable, biaxially stretched multilayer film in accordance with claim 1 wherein methyl acrylate comprises between about 6 and about 10 weight percent of the vinylidene chloride-methyl acrylate copolymer.

10. A heat-shrinkable, biaxially stretched multilayer film in accordance with claim 1 wherein the vinylidene chloride-vinyl chloride copolymer molecular weight is between about 75,000 and about 130,000.

11. A heat-shrinkable, biaxially stretched multilayer film in accordance with claim 1 wherein the vinylidene chloride-vinyl chloride copolymer molecular weight is between about 120,000 and about 130,000.

12. A heat-shrinkable, biaxially stretched multilayer film in accodance with claim 1 wherein vinyl chloride comprises between about 5 and about 35 weight percent of the vinylidene chloride-vinyl chloride copolymer.

13. A heat-shrinkable, biaxially stretched multilayer film in accordance with claim 1 wherein vinyl chloride comprises between about 15 and about 30 weight percent of the vinylidene chloride-vinyl chloride copolymer.

14. A heat-shrinkable, biaxially stretched multilayer film suitable for packaging primal and sub-primal meat cuts and processed meats, comprising a first outer layer comprising an ethylene-vinyl acetate copolymer, a core layer comprising a blend of vinylidene chloride-methyl acrylate copolymer and vinylidene chloride-vinyl chloride copolymer having between about 2.9 and about 13.5 weight percent methyl acrylate, and between about 2.9 and about 11.6 weight percent vinyl chloride copolymer, and a second outer layer comprising an ethylene-vinyl acetate copolymer.

15. A heat-shrinkable, biaxially stretched multilayer film in accordance with claim 14 wherein said first outer layer comprises an ethylene-vinyl acetate copolymer having a melt index of from about 0.1 to about 1.0 decigram per minute, and a vinyl acetate content of from about 9 to about 15 weight percent, based on the weight of said ethylene-vinyl acetate copolymer.

16. A heat-shrinkable, biaxially stretched multilayer film in accordance with claim 15 wherein said ethylene-vinyl acetate copolymer comprising said first outer layer is selected from the group consisting of (a) a single ethylene-vinyl acetate copolymer, and (b) a blend of ethylene-vinyl acetate copolymers having melt indices of from about 0.1 to about 1.0 decigram per minute, and vinyl acetate contents of from about 9 to about 15 weight percent, based on the weight of said ethylene-vinyl acetate copolymers.

17. A heat-shrinkable, biaxially stretched multilayer film in accordance with claim 14 wherein said second outer layer comprises an ethylene-vinyl acetate copolymer having a melt index of from about 0.1 to about 10 decigram per minute, and a vinyl acetate content of from about 3 to about 18 weight percent, based on the weight of said ethylene-vinyl acetate copolymer.

18. A heat-shrinkable, biaxially stretched multilayer film in accordance with claim 14 wherein said second outer layer comprises a blend of at least two ethylene-vinyl acetate copolymers, wherein one of said ethylene-vinyl acetate copolymers has a melt index of from about 0.1 to about 1.0 decigram per minute, and a vinyl acetate content of from about 10 to about 18 weight percent, based on the weight of said copolymer, and one of said ethylene-vinyl acetate copolymers has a melt index of from about 0.1 to about 1.0 decigram per minute and a vinyl acetate content of from about 2 to about 10 weight percent, based on the weight of said copolymer.

19. A heat-shrinkable, biaxially stretched multilayer film in accordance with claim 18 wherein said blend of said second ethylene-vinyl acetate copolymers has a vinyl acetate content of from about 3 to about 18 weight percent, based on the weight of said blend of ethylene-vinyl acetate copolymers.

20. A heat-shrinkable, biaxially stretched multilayer film in accordance with claim 14 wherein said first outer layer has a thickness from about 1.1 mils to about 2.0 mils.

21. A heat-shrinkable, biaxially stretched multilayer film in accordance with claim 14 wherein said core layer has a thickness of from about 0.20 mil to about 0.45 mil.

22. A heat-shrinkable, biaxially stretched multilayer film in accordance with claim 14 wherein said second outer layer has a thickness of from about 0.4 mil to about 1.5 mils.

23. A heat-shrinkable, biaxially stretched multilayer film in accordance with claim 14 wherein said film has a total thickness of from about 1.75 mils to about 4.0 mils.

24. A heat-shrinkable, biaxially stretched multilayer film suitable for packaging primal and sub-primal meat cuts and processed meats, said film having a first outer layer of thickness from about 1.1 mils to about 2.0 mils comprising an ethylene-vinyl acetate copolymer having a melt index of from about 0.1 to about 1.0 decigram per minute and a vinyl acetate content of from about 9 to about 15 weight percent, based on the weight of said ethylene-vinyl acetate copolymer, said ethylene-vinyl acetate copolymer being selected from the group consisting of (a) a single ethylene-vinyl acetate copolymer, and (b) a blend of ethylene-vinyl acetate copolymers having melt indices and vinyl acetate contents within the aforementioned ranges; a core layer of thickness from about 0.20 mil to about 0.45 mil comprising a blend of vinylidene chloride-methyl acrylate copolymer of molecular weight between about 75,000 and about 130,000 and vinylidene chloride-vinyl chloride copolymer with between about 4 and about 12 weight percent methyl acrylate and between about 5.8 and about 8.7 weight percent vinyl chloride in said blend and a maximum of 5 weight percent plasticizer based on the total blend weight of plasticizer and copolymer blend; and a second outer layer of thickness from about 0.4 mil to about 1.5 mils comprising an ethylene-vinyl acetate copolymer selected from the group consisting of (a) an ethylene-vinyl acetate copolymer having a melt index of from about 0.1 to about 1.0 decigram per minute and a vinyl acetate content of from about 3 to about 18 weight percent, based on the weight of said ethylene-vinyl acetate copolymer, and (b) a blend of at least two ethylene-vinyl acetate copolymers, wherein one of said ethylene-vinyl acetate copolymers has a melt index of from about 0.1 to about 1.0 decigram per minute and a vinyl acetate content of from about 10 to about 18 weight percent, based on the weight of said copolymer, and the other ethylene-vinyl acetate copolymer has a melt index of from about 0.1 to about 1.0 decigram per minute and a vinyl acetate content of from about 2 to about 10 weight percent, based on the weight of said copolymer; said film having been irradiated to a dosage level of between about 1 megarad and about 5 megarads.

25. A bag suitable for use in shrink packaging primal and sub-primal meat cuts and processed meats, said bag comprising a biaxially stretched multilayer film containing a barrier layer comprising a blend of vinylidene chloride-methyl acrylate copolymer and vinylidene chloride-vinyl chloride copolymer having between about 3 and about 13.5 weight percent methyl acrylate and between about 2.9 and about 11.6 weight percent vinyl chloride in said blend.

26. A bag in accordance with claim 25 wherein said multilayer film has at least three layers.

27. A bag in accordance with claim 25 wherein said multilayer film has been irradiated to a dosage level of between about 1 megarad and about 5 megarads.

28. A bag in accordance with claim 25 wherein said multilayer film comprises a first outer layer comprising an ethylene-vinyl acetate copolymer, a core layer comprising said copolymer blend, and a second outer layer comprising ethylene-vinyl acetate copolymer.

29. A bag in accordance with claim 18 wherein said methyl acrylate comprises between about 4 and about 12 weight percent and said vinyl chloride comprises between about 5.8 and about 8.7 weight percent in said blend.

30. A bag suitable for use in shrink packaging primal and sub-primal meat cuts and processed meats, said bag comprising a biaxially stretched multilayer film having a first outer layer comprising an ethylene-vinyl acetate copolymer having a melt index of from about 0.1 to about 1.0 decigram per minute and a vinyl acetate content of from about 9 to about 15 weight percent, based on the weight of said ethylene-vinyl acetate copolymer, said ethylene-vinyl acetate copolymer being selected from the group consisting of (a) a single ethylene-vinyl acetate copolymer, and (b) a blend of ethylene-vinyl acetate copolymers having melt indices and vinyl acetate contents within the aforementioned ranges;

a core layer comprising a blend of vinylidene chloride-methyl acrylate copolymer of molecular weight between about 90,000 and about 110,000, and vinylidene chloride-vinyl chloride copolymer of molecular weight between about 120,000 and about 130,000, with between about 4 and about 12 weight percent methyl acrylate copolymer and between about 5.8 and 8.7 weight percent vinyl chloride in said blend;

and a second outer layer comprising an ethylene-vinyl acetate copolymer selected from the group consisting of (a) an ethylene-vinyl acetate copolymer having a melt index of from about 0.1 to about 1.0 decigram per minute and a vinyl acetate content of from about 3 to about 18 weight percent, based on the weight of said ethylene-vinyl acetate copolymer, and (b) a blend of at least two ethylene-vinyl acetate copolymers, wherein one of said ethylene-vinyl acetate copolymers has a melt index of from about 0.1 to about 1.0 decigram per minute and a vinyl acetate content of from about 10 to about 18 weight percent, based on the weight of said copolymer, and the other ethylene-vinyl acetate copolymer has a melt index of from about 0.1 to about 1.0 decigram per minute and a vinyl acetate content of from about 2 to about 10 weight percent, based on the weight of said copolymer.

* * * * *